(No Model.) 2 Sheets—Sheet 1.

A. MOODY & E. A. DELANO.
DOUGH MIXER.

No. 442,448. Patented Dec. 9, 1890.

Witnesses
N. Rossiter
Fredk. H. Mills

Inventors
Alexander Moody
Eben A. Delano
By Jno. H. Whipple
Atty.

(No Model.) 2 Sheets—Sheet 2.
A. MOODY & E. A. DELANO.
DOUGH MIXER.
No. 442,448. Patented Dec. 9, 1890.
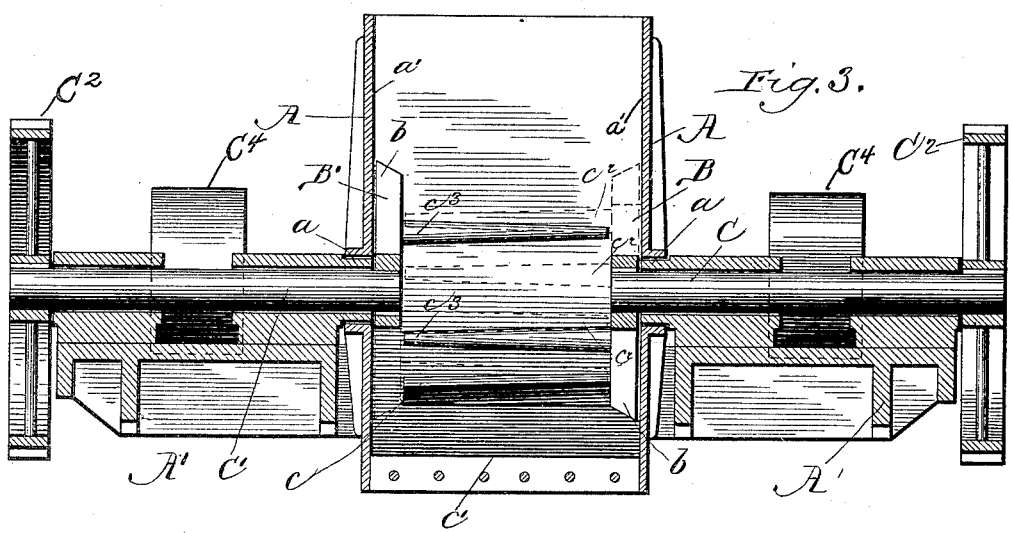
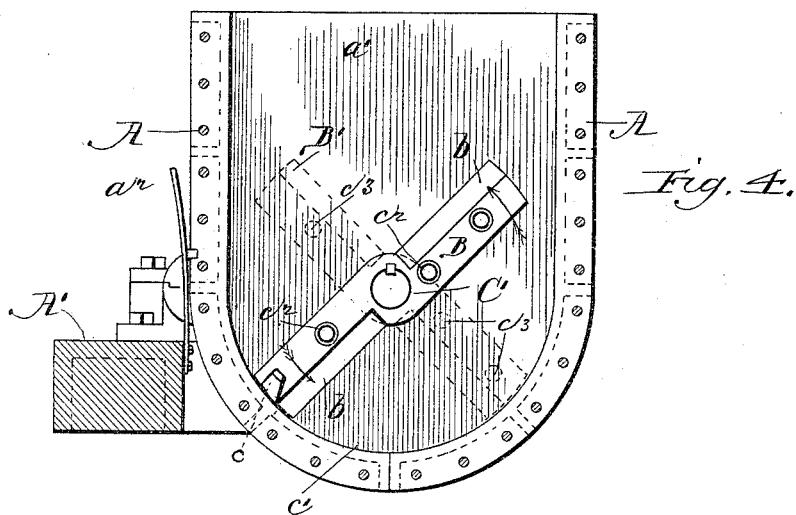
Witnesses
W. Rossiter
Fredk. H. Mills
Inventors
Alexander Moody
Eben A. Delano
By Jno. H. Whipple
Atty.

UNITED STATES PATENT OFFICE.

ALEXANDER MOODY AND EBEN A. DELANO, OF CHICAGO, ILLINOIS; SAID DELANO ASSIGNOR TO SAID MOODY.

DOUGH-MIXER.

SPECIFICATION forming part of Letters Patent No. 442,448, dated December 9, 1890.

Application filed September 17, 1889. Serial No. 324,219. (No model.)

*To all whom it may concern:*

Be it known that we, ALEXANDER MOODY and EBEN A. DELANO, of Chicago, in the State of Illinois, have invented certain new and useful Improvements in Dough-Mixers, of which the following is a specification.

Our invention relates particularly to dough-mixers for mixing pie-crust, which differs from other dough in having a large amount of shortening which must be mixed with the flour before adding the water, after which only slight kneading is required in order to leave the finished mixture light enough for the purpose. Owing to the peculiar character of this kind of dough, resulting in part from the method of its mixture, no machine, so far as we are informed, has heretofore been devised which will practically do the work required in producing it; and it is the object of our improvements to furnish a practical machine for the purpose. We have attained this object by the machine constructed, as illustrated in the accompanying drawings, in which—

Figure 2:
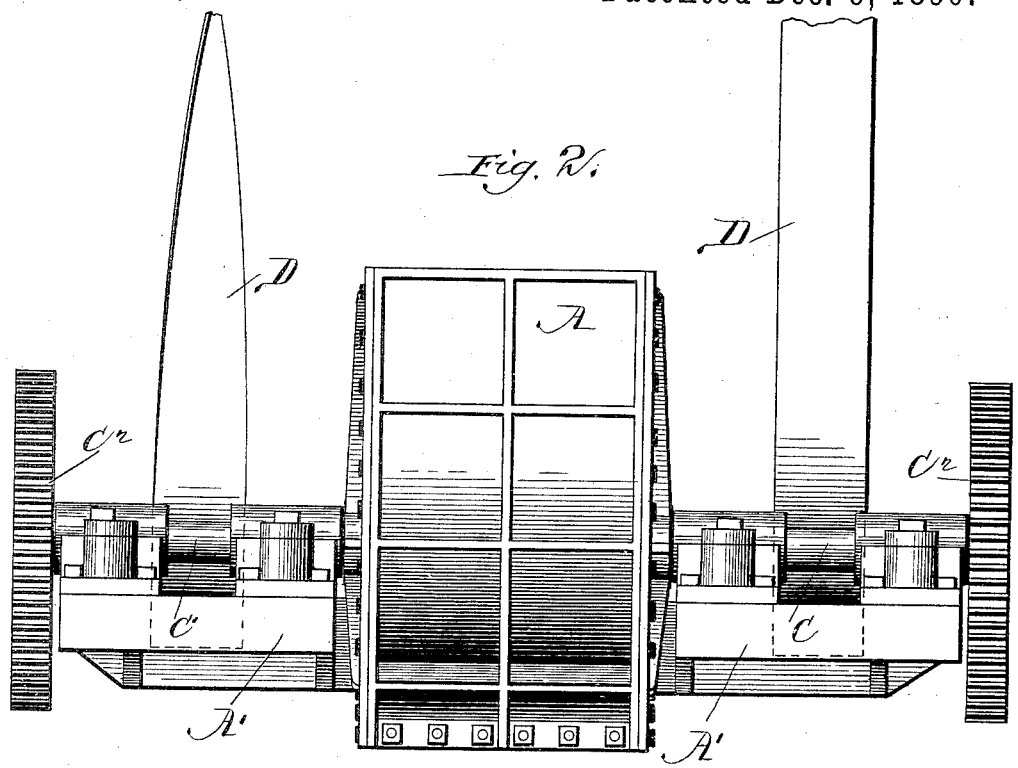
Figure 1:
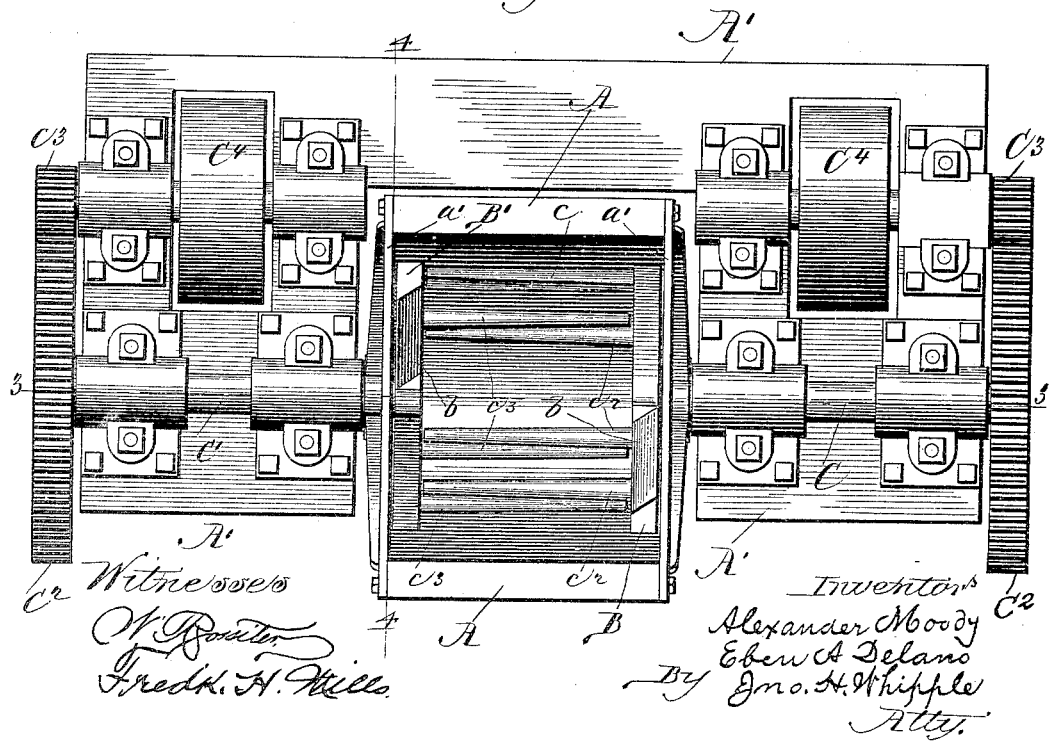

Figure 1 is a plan view of our machine, showing a trough or box provided with revolving heads having mixing-fingers and mechanism for operating the same. Fig. 2 is a side elevation of said machine, and shows the belts applied for operating the same. Fig. 3 is a longitudinal vertical section, taken on the line 3 3, of Fig. 1. In this view some of the mixing-fingers are represented by dotted lines. Fig. 4 is a transverse vertical section on the line 4 4 of Fig. 1, looking toward the right, and shows a view looking into one end of the trough with the end plate and one of the revolving heads removed, the position of the latter being indicated by dotted lines.

In the drawings, A designates the trough or box, which is pivotally suspended on trunnions $a$ of the frame A' of the machine, which are let into holes in the end plates $a'$ of the trough, so that the trough may be turned over for dumping its contents, there being a spring-latch $a^2$, Fig. 4, which engages in a notch in the side of the trough for holding it in normal position.

B and B' are the revolving heads, which are placed at each end of the trough just inside of the end plates $a'$, and supported on the ends of shafts C C', journaled in the frame of the machine, and extended through the trunnions which are made hollow for the purpose. These shafts are provided with wheels $C^2$, which gear with wheels $C^3$ on the shafts of belt-pulleys $C^4$ for operating the revolving heads. Said heads are beveled, as shown at $b$, on their front edges, so that the outer edge thus sharpened will run close to the inside of the end plates $a'$ of the trough and cut the dough clean from said plates. The revolving head B has a scraper $c$ at the outer end or periphery, which is likewise beveled and travels in close proximity to the cylindrical bottom $c'$ of the trough and cuts the dough clean therefrom. This head B also has mixing-fingers $c^2$, which are made circular and tapering and which extend lengthwise in the trough nearly to the head B', and said head B' has similar fingers $c^3$, which extend across the trough and nearly to the head B. Said heads revolve in opposite directions, such motions being produced by crossing one of the operating-belts D, and the mixing-fingers $c^2$ and $c^3$ pass one another in close contact, as seen in Fig. 1, and traverse almost the entire space within the semi-cylindrical portion of the trough and between the heads, so that the shortening—cold lard or butter—can be thereby thoroughly and quickly rubbed into the flour when placed in the trough together in the proper proportion. After the shortening and flour are thus mixed the water is applied and the operation of the fingers continued a short time—say for about four or five revolutions. The batch is then dumped into a tray or other suitable receptacle by releasing the latch $a^2$ and inverting the trough.

By the use of the machine several batches of dough can be made of exactly the same character or quality, being mixed more uniformly and better than can be done by hand, and also much quicker.

It should be observed that fingers or tapering slender pieces of like width and thickness, as contradistinguished from knives or flat blade-like pieces, are a necessary part of our invention, for the reason that they must pass each other in close proximity in order to rub cold lard or butter shortening into the flour before the water is added, and also for the reason that after the water is added the stirring required must break up the mass and avoid compressing or packing portions of it together in order to leave the mixture light.

Having thus described our invention, what we claim, and desire to secure by Letters Patent, is—

In a pie-crust mixer, and in combination, the trough provided with a semi-cylindrical bottom and end plates perpendicular thereto, revoluble heads in each end of said trough, with beveled edges $b$ in front adapted to scrape the end plates, a beveled scraper $c$, attached to one of said heads and adapted to scrape the trough-bottom, slender mixing-fingers $c^2$, of like width and thickness, attached at one end to said heads so as to pass each other in close contact in revolution and reaching through the space between the heads, and mechanism, substantially as shown, for revolving said heads at a uniform speed in opposite directions, as specified.

ALEXANDER MOODY.
EBEN A. DELANO.

Witnesses:
JNO. H. WHIPPLE,
ROBERT VAN SANDS.